(12) United States Patent
Kothari

(10) Patent No.: US 10,832,318 B1
(45) Date of Patent: Nov. 10, 2020

(54) COMPUTER-BASED SYSTEMS AND PLATFORMS AND COMPUTER-IMPLEMENTED METHODS CONFIGURED FOR TRACKING DATA OBJECTS' BEHAVIOURS AND UTILIZING GRAPHICAL USER INTERFACE ELEMENTS TO EXECUTE NUMEROUS ELECTRONIC ACTIVITIES WITH A SINGLE INSTRUCTION

(71) Applicant: Capital One Services, LLC, McLean, VA (US)

(72) Inventor: Ankit Kothari, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/725,805

(22) Filed: Dec. 23, 2019

(51) Int. Cl.
*G06Q 40/00* (2012.01)
*G06Q 40/02* (2012.01)
(Continued)

(52) U.S. Cl.
CPC ........... *G06Q 40/02* (2013.01); *G06F 3/0482* (2013.01); *G06F 3/0484* (2013.01); *G06Q 20/14* (2013.01);
(Continued)

(58) Field of Classification Search
CPC ........ G06Q 40/02; G06Q 20/14; G06Q 20/34; G06Q 30/0213; G06Q 30/0234; G06Q 30/0235; G06F 3/0482; G06F 3/0484
See application file for complete search history.

(56) References Cited

U.S. PATENT DOCUMENTS

| 8,540,151 B1 * | 9/2013 | Snyder | G06Q 20/24 |
| | | | 235/375 |
| 2003/0069785 A1 * | 4/2003 | Lohse | G06Q 30/0236 |
| | | | 705/14.35 |

(Continued)

FOREIGN PATENT DOCUMENTS

| JP | 2001-520425 | * 10/2001 | ............. G06Q 20/10 |
| WO | WO-2016025291 A1 * | 2/2016 | ............. G06Q 30/02 |

(Continued)

OTHER PUBLICATIONS

Harlan, "How to Use Mint.com to Track Your Minimum Spending Requirements," https://outandout.boardingarea.com/how-to-use-mint-com-to-track-your-minimum-spending-requirments/ (Year: 2015).*

(Continued)

*Primary Examiner* — Alexander G Kalinowski
*Assistant Examiner* — William B. Bunker
(74) *Attorney, Agent, or Firm* — Greenberg Traurig, LLP

(57) ABSTRACT

Systems and methods involving computer-based processing for helping customers meet their minimum spend requirement for their introductory credit card offer are disclosed. In one embodiment, an exemplary computer-implemented method may comprise: receiving a total spending amount of a promotional credit card associated with an introductory credit card offer; determining a critical amount to satisfy the minimum spending amount of the promotional credit card; and causing to present a reminder on a screen of a user-associated computing device.

19 Claims, 13 Drawing Sheets

(51) Int. Cl.
*G06Q 30/02* (2012.01)
*G06Q 20/34* (2012.01)
*G06F 3/0482* (2013.01)
*G06Q 20/14* (2012.01)
*G06F 3/0484* (2013.01)

(52) U.S. Cl.
CPC ......... *G06Q 20/34* (2013.01); *G06Q 30/0213* (2013.01); *G06Q 30/0234* (2013.01); *G06Q 30/0235* (2013.01)

(56) References Cited

U.S. PATENT DOCUMENTS

| | | | | |
|---|---|---|---|---|
| 2003/0200143 | A9* | 10/2003 | Walker | G06Q 30/0236 705/14.23 |
| 2006/0122921 | A1* | 6/2006 | Comerford | G06Q 30/0235 705/35 |
| 2008/0116260 | A1* | 5/2008 | Shafer | G06Q 20/12 235/380 |
| 2011/0153403 | A1* | 6/2011 | Postrel | G06Q 30/02 705/14.29 |
| 2012/0215610 | A1* | 8/2012 | Amaro | G06Q 30/02 705/14.23 |
| 2013/0041735 | A1* | 2/2013 | Johnson | G06Q 50/01 705/14.23 |
| 2013/0054463 | A1* | 2/2013 | Olson | G06O 30/06 705/44 |
| 2013/0124361 | A1* | 5/2013 | Bryson | G06Q 30/0631 705/26.7 |
| 2013/0151321 | A1* | 6/2013 | Roman | G06Q 30/0207 705/14.15 |
| 2013/0191213 | A1* | 7/2013 | Beck | G06O 20/3224 705/14.53 |
| 2013/0325577 | A1* | 12/2013 | Bonner | G06Q 30/0226 705/14.27 |
| 2014/0122213 | A1* | 5/2014 | Wong | G06O 30/0233 705/14.33 |
| 2016/0086222 | A1* | 3/2016 | Kurapati | G06Q 30/0261 705/14.53 |
| 2016/0117765 | A1* | 4/2016 | Koeppel | G06Q 40/00 705/35 |
| 2018/0033036 | A1* | 2/2018 | Loosli | H04L 67/10 |
| 2020/0126105 | A1* | 4/2020 | Joglekar | G06Q 40/00 |

FOREIGN PATENT DOCUMENTS

| | | | | |
|---|---|---|---|---|
| WO | WO-2018119516 A1 * | 7/2018 | ......... | G06Q 30/0226 |
| WO | WO-2019195263 A1 * | 10/2019 | ............. | G06Q 30/02 |

OTHER PUBLICATIONS

Katie Genter, "11 Ways to meet credit card bonus minimum spending requirements," hhttps://thepointsguy.com/guide/ways-to-meet-minimum-spending-requirement/ (Year: 2019).*

* cited by examiner

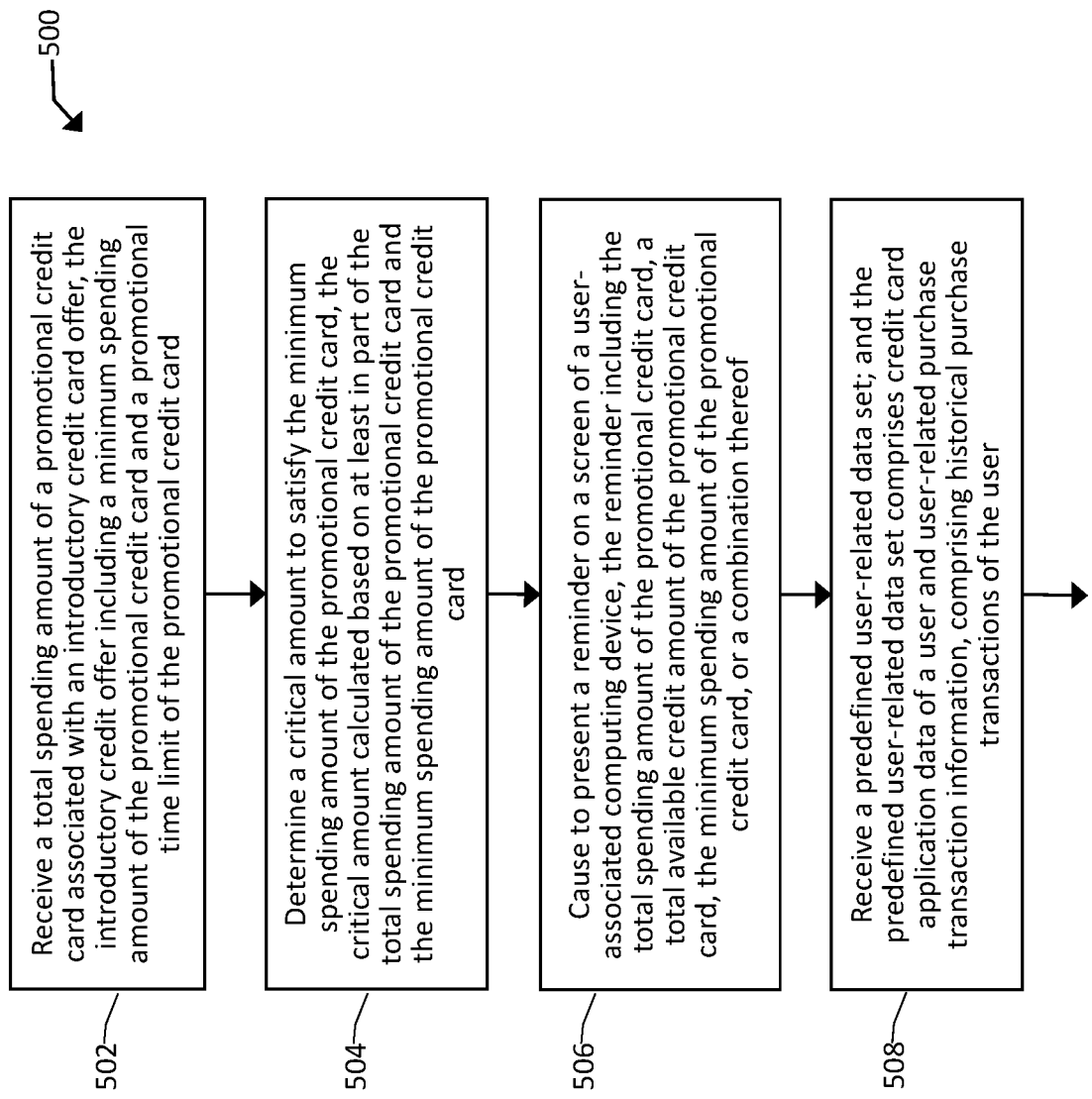

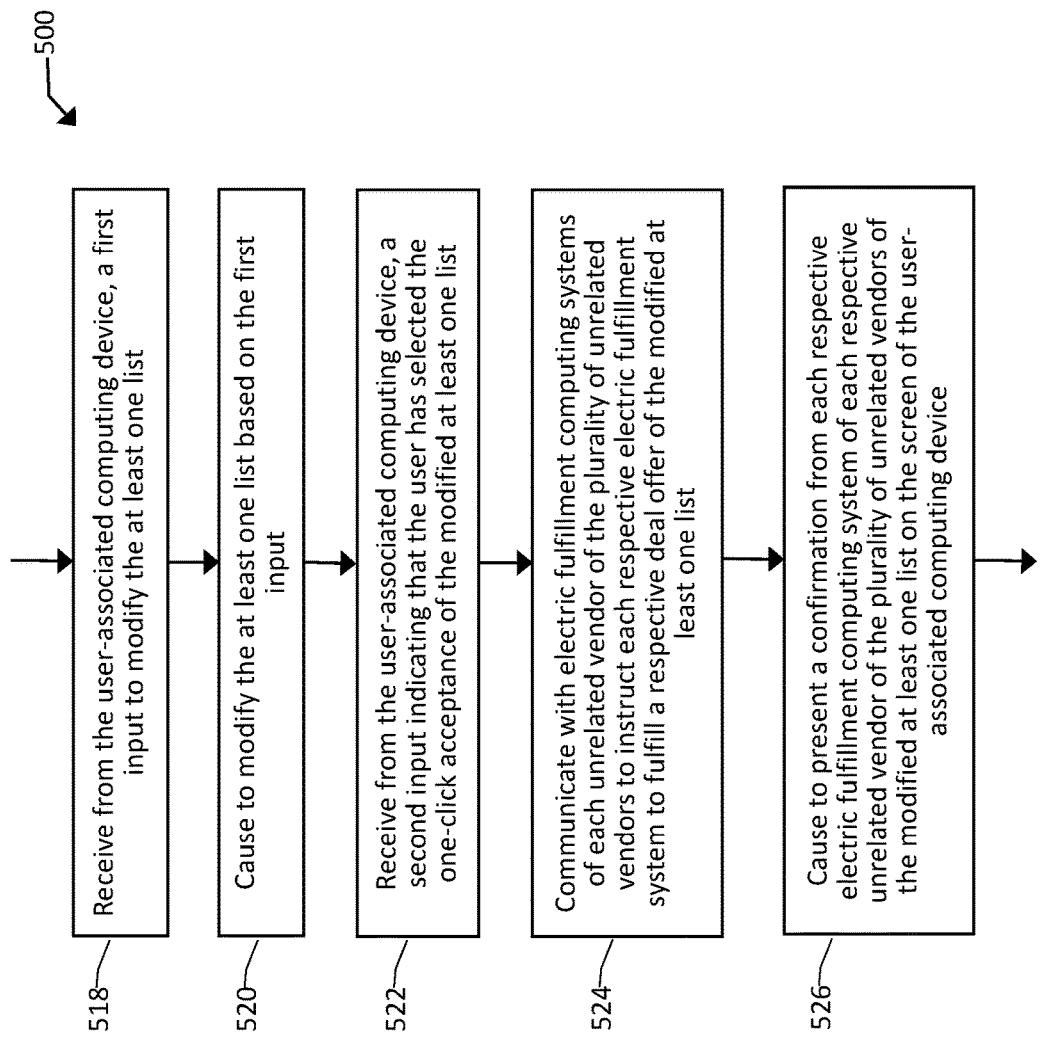

COMPUTER-BASED SYSTEMS AND PLATFORMS AND COMPUTER-IMPLEMENTED METHODS CONFIGURED FOR TRACKING DATA OBJECTS' BEHAVIOURS AND UTILIZING GRAPHICAL USER INTERFACE ELEMENTS TO EXECUTE NUMEROUS ELECTRONIC ACTIVITIES WITH A SINGLE INSTRUCTION

FIELD OF TECHNOLOGY

The present disclosure generally relates to improved computer-based platforms and systems and improved computer-implemented methods configured for one or more novel technological applications involving data tracking and executing electronic activities.

BACKGROUND OF TECHNOLOGY

A computer network platform/system may include a group of computers (e.g., clients, servers) and other computing hardware devices that are linked together through one or more communication channels to facilitate communication and/or resource-sharing, via one or more specifically programmed graphical user interfaces (GUIs) and/or software applications of the present disclosure, among a wide range of users.

SUMMARY OF DESCRIBED SUBJECT MATTER

In some embodiments, the present disclosure provides various exemplary technically improved computer-implemented platforms, systems and methods, including methods for tracking data objects' behaviours and utilizing graphical user interface elements to execute numerous electronic activities with a single instruction such as receiving data objects' behaviors, wherein the data objects' behaviors include predefined user-related data sets, wherein the predefined user-related data set comprises application data of a user and user-related transaction information, comprising historical transactions of the user; identifying at least one other user based on the application data of the user; wherein a particular demographic profile of the at least one other user matches an original demographic profile of the user; receiving user-unrelated transaction information and a pre-determined value corresponding to a number of electronic activities that the user is required to performed to meet a pre-determined performance target, wherein the user-unrelated transaction information comprises transactions of the at least one other user; generating at least one list of two or more electronic activities based on the number of electronic activities and at least one of the predefined user-related data set, the user-related transaction information, the user-unrelated transactions information, or a combination thereof, wherein two or more user-personalized electronic activities are associated with distinct computing systems of two or more distinct entities; causing to display a user-personalized offers presenting graphical user interface (GUI) on the screen of the user-associated computing device; wherein the user-personalized offers presenting GUI comprises a visual presentation of the at least one list of two or more user-personalized electronic activities and an interface element configured to accept user's selection of the at least one list with a one-click action.

In some embodiments, the present disclosure also provides exemplary technically improved computer-based systems and computer-readable media, including media implemented with and/or involving one or more software applications such as notifications, purchase and payment services, whether resident on computer devices or platforms, provided for download via a server and/or executed in connection with at least one network such as via a web browser application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 5A-5D are flowcharts illustrating one exemplary method for helping customers to meet their minimum spend requirement for their introductory credit card offer process, consistent with exemplary aspects of at least some embodiments of the present disclosure.

DETAILED DESCRIPTION

Figure 1:
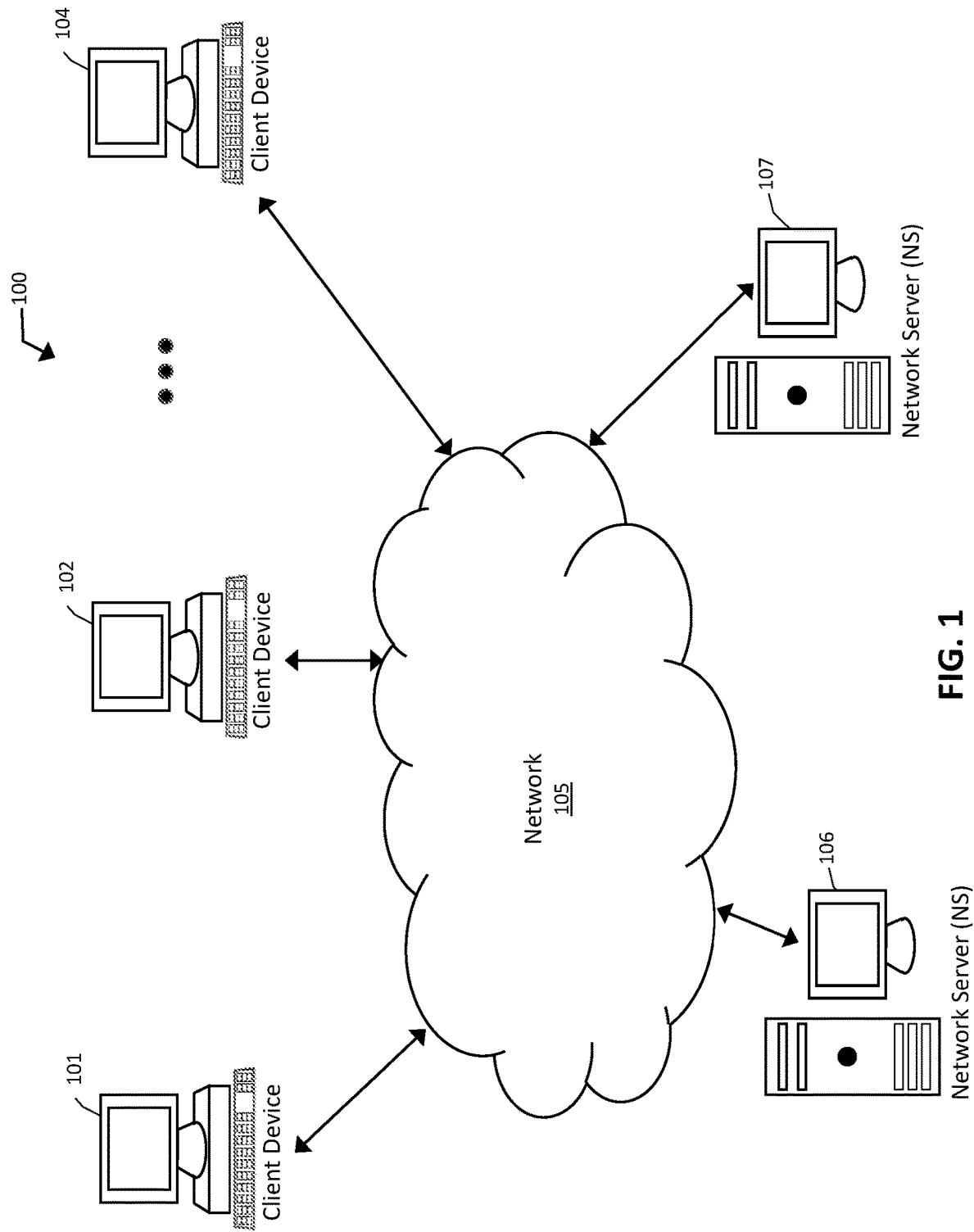
FIG. 1 is a block diagram depicting an exemplary computer-based system and platform, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) los; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS);

GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH), WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Described herein are methods, systems, computer readable media, etc. for helping customers meet their minimum spend requirement for their introductory credit card offer. When a user gets a new credit card, many times there is an introductory offer, reward or promotion involved with that credit card. Here are some examples of such offer, reward or promotion—'Earn a one-time $200 cash bonus once you spend $3,000 on purchases within the first 3 months from account opening.' Here is another example of such offer, reward or promotion—'Earn a one-time bonus of 50,000 miles—equal to $500 in travel—once you spend $4,500 on purchases within the first 3 months from account opening.' Most of these offers, rewards or promotions are offered while getting a new credit card, and sometimes they are also offered for existing credit cards. However, after users got their new credit cards, users need to figure out by themselves on a constant basis as to how much users have spent so far minus any refunds on their credit card and whether users have met the minimum spend requirements within the time limit agreed in their credit card agreement or not. Further, sometimes the promotional time limit does not match the credit card billing cycle end date, so it's something that users have to always keep track of manually. In addition, if there is no reminder to the user, then the user must constantly keep track of when the promotion time limit might be ending and must make sure that the user meets the minimum spend requirement in order to secure the reward from the credit card promotional offer. Moreover, if the user is close to the end of their credit card promotional time limit, however, the user has not met his/her minimum spend requirements for the promotional offer, then good suggestions are much needed to the user for where they can easily spend or where are other people commonly spending during their credit card promotional time period in order to meet their minimum spend requirements.

Described herein, for example, provides a method/system for users to view the total spending they have done to date versus the minimum spend requirements of their credit card offer. In some implementations, the system also displays the promotional time limit (i.e. start and end date) to the users so the users don't need to keep track of the promotional time range manually. In some embodiments, the system may display the remaining amount that the user needs to spend in order to meet their minimum spend requirement for their credit card offer. In some implementations, in addition to textual representation, this information may also be represented in graphical formats such as pie chart, slider bar, bar graph, etc. In various embodiments, animation may also be used to present the above information to the users.

According to some embodiments, the system may generate and send reminders or alerts using text, email, voice, etc. to the users when the credit card promotional offer time limit is about to end and the user has still not met their minimum spend requirement in order to secure the reward from their promotional offer. In some implementations, frequency of such reminders or alerts may be preset in the system and may also be updated by the users to either increase or decrease or stop the alerts altogether.

In another exemplary embodiment, the system may use machine learning algorithms to analyze the data from the user's previous spending transactions and accordingly proposes other potentially similar spend transactions that might help the user meet their minimum spend requirement for their credit card promotional offer. In another exemplary embodiment, by analyzing the previous spending transactions of the user, machine learning algorithms may identify the categories where a user is likely to spend and propose other potentially similar spend transactions in those categories. In certain implementations, either the supervised learning or the unsupervised learning machine learning algorithms may be used for analyzing spend transactions. In one or more further embodiments, system may also continuously look for items that have been comparatively discounted in price in those identified categories and may present them to the users.

In other embodiments, the system may use machine learning algorithms to analyze the previous spending transactions of the user and identify the categories where a user has not yet made any spend transactions, but they are likely to do so in the future, and propose potential spending transactions in those newly identified categories. According to some embodiments, system may also continuously look for items that have been comparatively discounted in price in those newly identified categories and the system may present them to the users.

In some implementations, when the promotional offer time limit is about to end and the user has still not met their minimum spend requirement, the system may send multiple reminders to users to complete their minimum spend requirement. In certain implementations, system may also use machine learning algorithms to analyze the data from the user's previous spending transactions and accordingly proposes other potentially similar spend transactions that might help the user meet their minimum spend requirement for their credit card promotional offer.

In some embodiments, when the user doesn't have any previous spend transactions on their credit card account, machine learning algorithms within the system may use data from the predefined data set in the system to propose one or more spend transactions that might help the user meet their minimum spend requirement for their credit card promotional offer.

In other embodiments, when a user doesn't have any previous spend transactions on their credit card account, machine learning algorithms within the system may identify the potential categories which the user might be interested in based on the credit card application data that was originally provided by the user including job profile, income, etc. and propose one or more spend transactions that might help the user meet their minimum spend requirement for their credit card promotional offer.

In other embodiments, system may also use machine learning algorithms to learn the user's interests based on previous transactions and common spending patterns, and then suggest merchant gift cards that might be of interest to the user and purchasing those may help them to meet their minimum spend requirements for their promotional credit card offer. In various embodiments, system may also provide the functionality to the user to be able to easily purchase such gift cards. In one or more further embodiments, the system may also be able to provide discounts on the gift card purchases and make it easy for the users to buy gift cards in order to meet their minimum spend requirements within the credit card promotional time period. Alternatively, the system may have an option to display sponsored gift cards at the top of the suggested gift card list that is presented to the users.

According to some embodiments, the system may use machine learning algorithms to learn the user's interests based on previous transactions and common spending patterns, and then suggest various deals such as dining, flight, hotel, health, local, national deals, etc., which might be of interest to the user and purchasing those may help them to meet their minimum spend requirements for their promotional credit card offer. In some embodiments, the system may provide the functionality to the users to be able to easily purchase such deals. In other embodiments, the system may be able to automatically provide discounts on the deals and make it easy for the users to buy those deals in order to meet their minimum spend requirements within the credit card promotional time period. In various embodiments, the system may have an option to display sponsored deals from merchants at the top of the suggested deal list that is presented to the users. In some implementations, the deal suggested by the system to the user may also be in partnership with other websites such as groupon.com, livingsocial.com, etc.

In certain implementations, the system may use machine learning algorithms to learn from commonly spend transactions made by other credit card users of the system, both current and previous users, during their credit card promotional time period, and suggest those most common spend transactions to new users to assist them in meeting their minimum spending requirements for their credit card offer. Additionally, based on a predefined dataset, the machine learning algorithms of the system may also identify and exclude any inappropriate spend transactions of other credit card users from the spend transaction suggestion list that is presented to new users. In other embodiments, the user may be able to specify their preferences about the potential spend transaction suggestions presented to them, and based on their preferences, machine learning algorithms may identify and include those spend transaction suggestions that meet user preferences and exclude any spend transactions from the spend transactions suggestion list that do not meet the user preferences.

According to some embodiments, the system may not only show the total spending that the user has made so far versus the minimum spend requirements of the credit card offer, but the system may also display the timeline view showing the breakdown of when the user did their spending at different times. In some implementations, if the user returns some of their previously purchased product or service and the merchant refunds the spent amount back on the credit card, the system may display those refund amounts on the timeline view showing how the spend increased or decreased during the course of the credit card promotion time period. In one or more further embodiments, this timeline view may give the complete picture to users about how much and when they were spending and how much and when refunds came back from merchants to their credit card accounts. Additionally, this timeline view may display to the users how much more spending they still need to do in order to meet their minimum spend transaction amount for the credit card promotion offer.

According to some embodiments, the system may comprise of a 'one-click meet minimum spending requirement' module, which displays a cluster of potential purchase transactions (i.e., one or more transactions grouped together comprising of various items such as gift cards, discounted product or services, etc.). In some implementations, the user may purchase many different items with one-click of the button to meet their minimum spend transaction amount for their credit card promotional offer. In certain implementations, this module may use machine learning algorithms to learn the user's interests and suggest the cluster of transactions that may be of interest to the user. In some embodiments, this module may identify how much the user has already spent on their credit card and the remaining amount that user still needs to spend in order to meet the minimum spend amount for their credit card's introductory promotional offer. In other embodiments, the system may display the cluster of potential purchase transactions, which add up to that remaining amount that the user still needs to spend to meet the minimum spend requirement of their credit card introductory offer. In various embodiments, the system may allow the user to make modifications, for example, add, update or delete any of the potential purchase transactions in the cluster and then make the purchase. In one or more further embodiments, the total purchase amount may be either less or more than the minimum spend requirement needed to meet the credit card's introductory promotional offer. As described above, the 'one-click meet minimum spending requirement' module can convert several purchasing transactions to a single one purchasing transaction. Therefore, this technology is implemented has less data to process and display thereby improving the processing capability of the computer system.

In some implementations, the system may comprise of a 'Promotional offer end date and billing cycle end date sync' module, which will provide a GUI (graphical user interface) for the users to request a change to their credit card billing cycle end date such that the promotional offer end date matches the date of the credit card billing cycle end date. In certain implementations, by using this module, the system may allow the user to sync the promotional offer end date and billing cycle end date and will not need to keep track of promotional offer end date separately since it will match the same date as the billing cycle end date.

According to some embodiments, when the user has multiple credit cards (from one or multiple providers) but only one of the cards has an introductory or other promotional offer whereas other cards don't have any promotional offer, and the user attempts to purchase an item using an ineligible non-introductory offer credit card, the system may send an alert to the user to remind the user to use the card with the pending introductory or other promotional offer so the user can meet their minimum spend requirement and secure the reward of the introductory or other promotional offer. In some embodiments, the system may send alerts or reminders using various communication methods such as text, email, voice, etc. and those are within the spirit and scope of the present invention. In various embodiments, the system may send alerts or reminders either real-time or at a later time.

In some implementations, when the user has multiple credit cards (from one or multiple providers) but only one of the cards has an introductory or other promotional offer whereas other cards don't have any promotional offer, and the user attempts to generate a virtual card number using an ineligible non-introductory offer credit card to use it for an online purchase, the system may alert the user that the card with the introductory or other promotional offer has not yet met its minimum spend requirement and recommend the user to generate the virtual card number using that credit card which has the pending introductory or other promotional offer. In certain implementations, the system may send alerts or reminders using various communication methods such as display the information online, send a text, email, voice call, etc. and those are within the spirit and scope of the present invention. In some embodiments, the system may send alerts or reminders either real-time or at a later time.

In another embodiment of the present invention, when the user has multiple credit cards from a provider or a partner provider, wherein one of the cards has an introductory promotional offer whereas other cards don't have the introductory promotional offer, the system uses machine learning algorithms to analyze the transactions data from user's non-introductory offer credit cards and accordingly proposes potentially similar spend transactions that can be made using the introductory promotional offer eligible credit card. Analyzing the previous spending transactions of the user, machine learning algorithms can also identify the categories where a user is likely to spend and propose other potentially similar spend transactions in those categories, and that's within the spirit and scope of the present invention.

In some implementations, the system may allow the user to have multiple products or accounts (from one or multiple providers), such as a bank account and a credit card account, or multiple credit card accounts, etc., and one of the credit cards has an introductory or other promotional offer with minimum spend requirement whereas other products or accounts don't have any promotional offer. In certain implementations, the system may identify any recurring or commonly repeating transactions on the ineligible non-introductory offer accounts or products and suggest on the user's respective billing cycle statements or online transaction views that those recurring or repeating transactions can be instead made using the credit card with pending introductory or other promotional offer. In some embodiments, the system may display suggestions for the user to suggest the user to use the credit card with the introductory or other promotional offer in one or more ways such as aggregate all such suggestions for all recurring or repeating transactions at one place, or display each respective suggestion next to each individual recurring or repeating transaction, etc.

In some embodiments, the one or multiple providers can be either a subsidiary, affiliate, third party partner, business partner, contractual partner or any partner company who work together to pursue a business initiative.

In some implementations, the system may comprise of a module that connects the system with the intelligent smart assistant. In certain implementations, when a credit card with an introductory promotional offer is activated, the system may request permission from the user to connect with user's intelligent smart assistant if it exists. According to some embodiments, once the user permission is granted and system is connected with the intelligent smart assistant, the system may share the details of the credit card's introductory offer along with the offer ending date with the smart assistant, such that the smart assistant can later remind the user at a regular interval to complete the minimum spend requirements and avail the reward of the introductory promotional offer.

In some embodiments, the system may comprise of an app which requests permission from the users' smart device to keep track of their location using the GPS, geographic positioning system, in the smart device and send location relevant credit card related notifications. In various embodiments, when the user has given permission to the app to track their location, and the user has a credit card with an introductory promotional offer and they visit a location where there is a potential for doing a credit card transaction, the system may proactively suggest the user on their smart device to use the card with the introductory promotional offer if they potentially make any transactions or purchases at that location. In some implementations, the notification from the system may display how much the user has already spent on their credit card so far and how much more spending they still need to do in order to meet their minimum spend transaction amount for availing the reward from their credit card promotional offer.

In certain implementations, the system may comprise of a module which provides the ability for the users with pending introductory promotional offer on their credit card to directly make a donation to the charity of their choice using their credit card. By way of example and not limitation, the module may comprise of a graphical user interface (GUI), that displays all the participating charities on a single portal as well as the remaining amount that the user still needs to spend in order to meet their minimum spend requirement of their credit card introductory offer. According to some embodiments, by using the GUI, the system may allow the user to select the charity of the user's choice and the amount that the user wish to donate, and allow the user to directly make the donation using their credit card. In some embodiments, this module may be available to the users all the time, however, when the credit card's introductory promotional offer end date is close (e.g., 3 days before the offer end date), the system may send an alert to the user to suggest the user to make a donation to the charity of their choice, which will also help them to meet the minimum spend amount requirement of their credit card's introductory promotional offer.

In various embodiments, the system may comprise of the module which allows the user who might not be able to meet the minimum spend requirement of their credit card's promotional offer within the offer time limit, to view the alternate options available to the user. In some implementations, alternate options in the module may comprise of various options such as requesting an extension of time to be given after the original offer end date, requesting a lower minimum spending requirement which might have a lower reward amount associated with it, etc. In certain implementations, this module may use machine learning algorithms to analyze the data associated with the user's previous spend history, other accounts with provider, user's profile information, etc. and decide if the user should be granted the alternate option selected by the user and provide a real-time decision to the user. In some embodiments, this module may comprise of a graphical slider function along with various minimum spend amounts on the x-axis, where a user will be able to move the slider to request a different minimum spending amount for their credit card introductory promotional offer, and a different reward amount will be displayed for each selected minimum spend amount on the slider. In other embodiments, this module may comprise of a graphical slider function along with various extension dates listed on the x-axis, where a user will be able to move the slider to request a different end date for their credit card introductory promotional offer, and a different reward amount will be displayed for each selected extended end date on the slider. In various embodiments, the alternate options provided by the system to the user may be customized per user, and the user might not see all the alternate options available to another user.

The words 'offer', 'reward', 'introductory promotional offer', 'introductory offer', or 'promotion' have been used interchangeably in this document, however, they all refer to the same concept of introductory promotional offer or reward for getting a new credit card.

FIG. 1 depicts a block diagram of an exemplary computer-based system/platform 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 101-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 101-104 may be personal computers, multiprocessor systems, microprocessor-based or programmable consumer electronics, network PCs, and the like. In some embodiments, one or more member devices within member devices 101-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 101-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 101-104 may include may run one or more applications, such as Internet browsers, mobile applications, voice calls, video games, videoconferencing, and email, among others. In some embodiments, one or more member devices within member devices 101-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 101-104 may be specifically programmed by either Java, .Net, QT, C, C++ and/or other suitable programming language. In some embodiments, one or more member devices within member devices 101-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 101-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
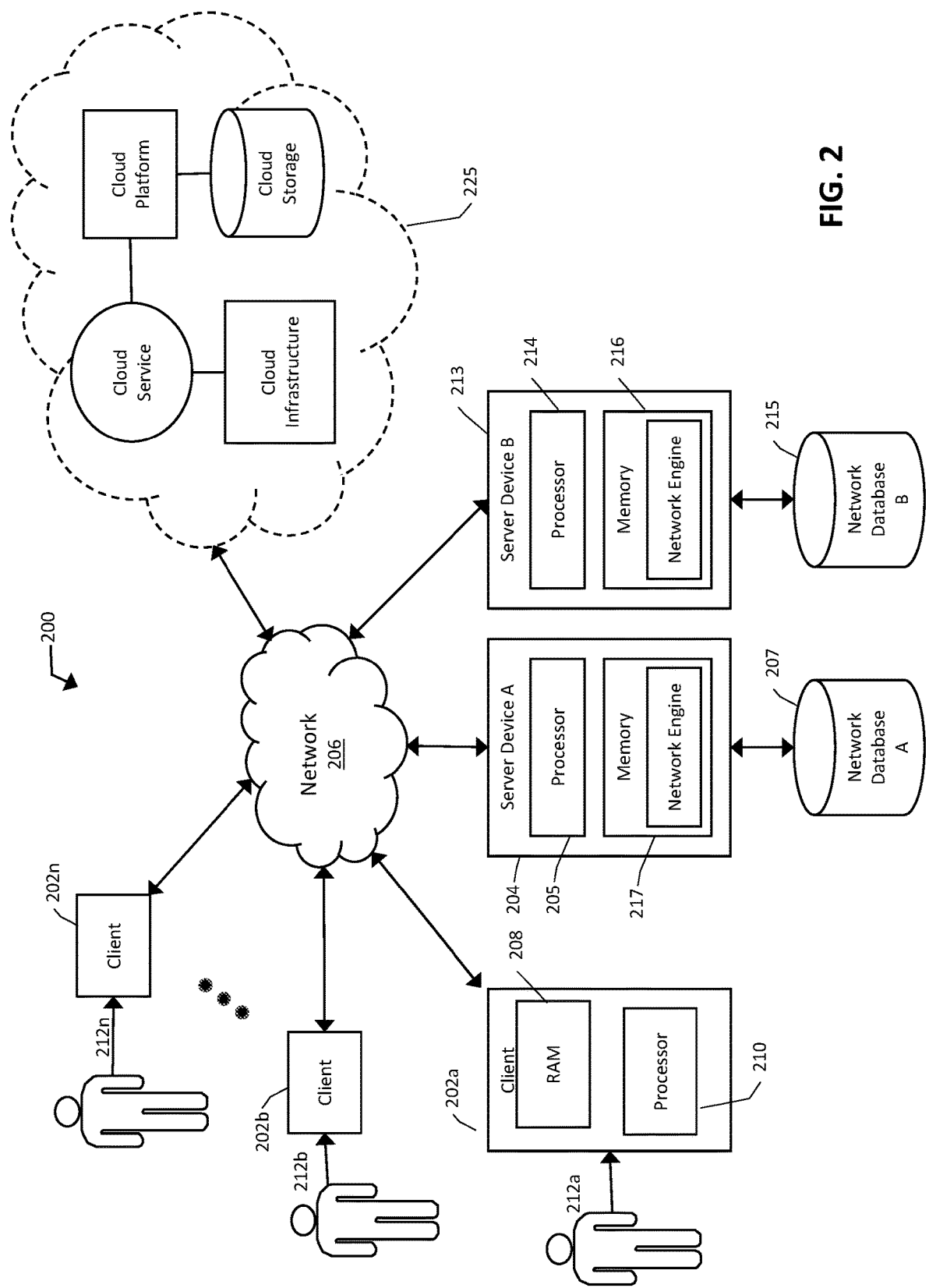
FIG. 2 is a block diagram depicting another exemplary computer-based system and platform, in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 202a-n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a-n may be specifically programmed with one or more application programs in accordance with one or more principles/methodologies detailed herein. In some embodiments, member computing devices 202a-n may operate on any operating system capable of supporting a browser or browser-enabled application, such as Microsoft™, Windows™, and/or Linux. In some embodiments, member computing devices 202a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a-n, users, 212a-n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a-n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
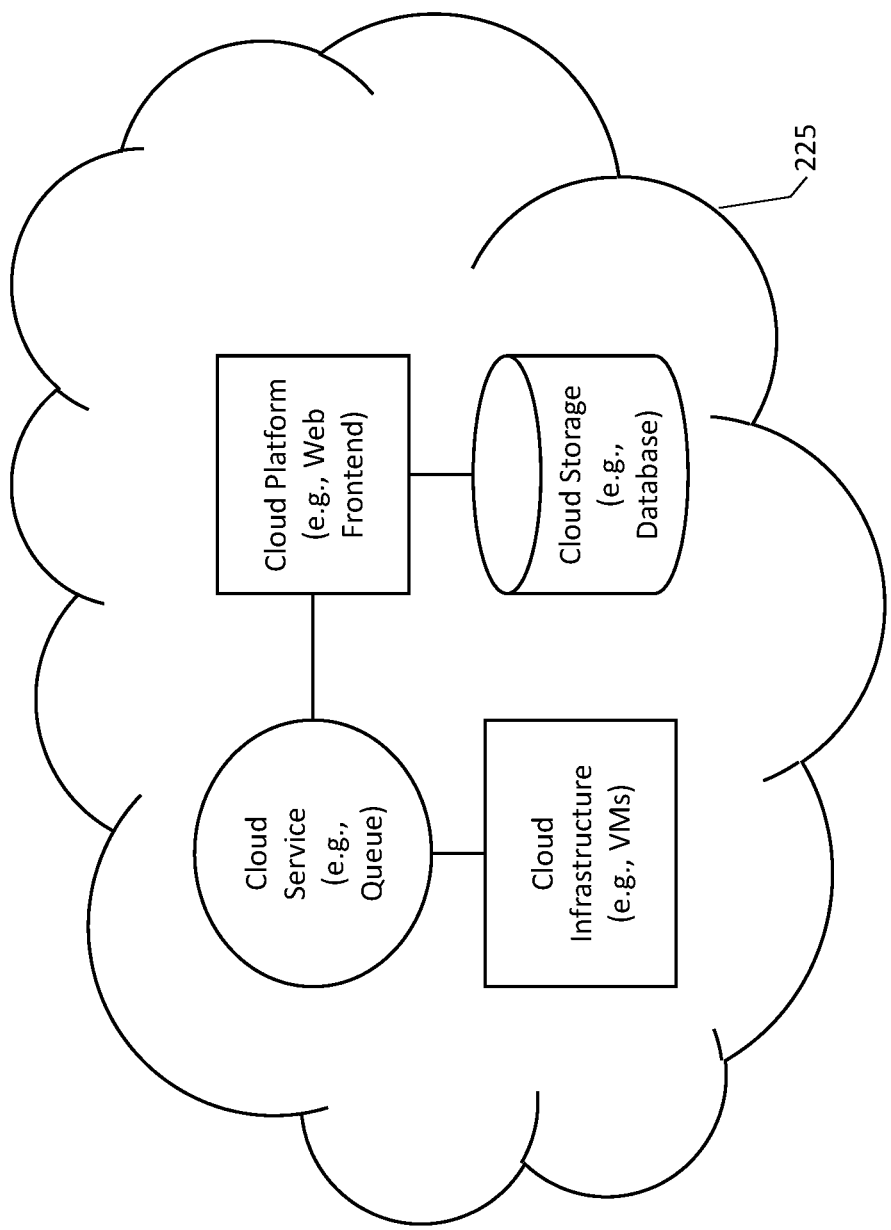
FIGS. 3 and 4 are diagrams illustrating two exemplary implementations of cloud computing architecture/aspects with respect to which the disclosed technology may be specifically configured to operate, in accordance with one or more embodiments of the present disclosure.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 4:
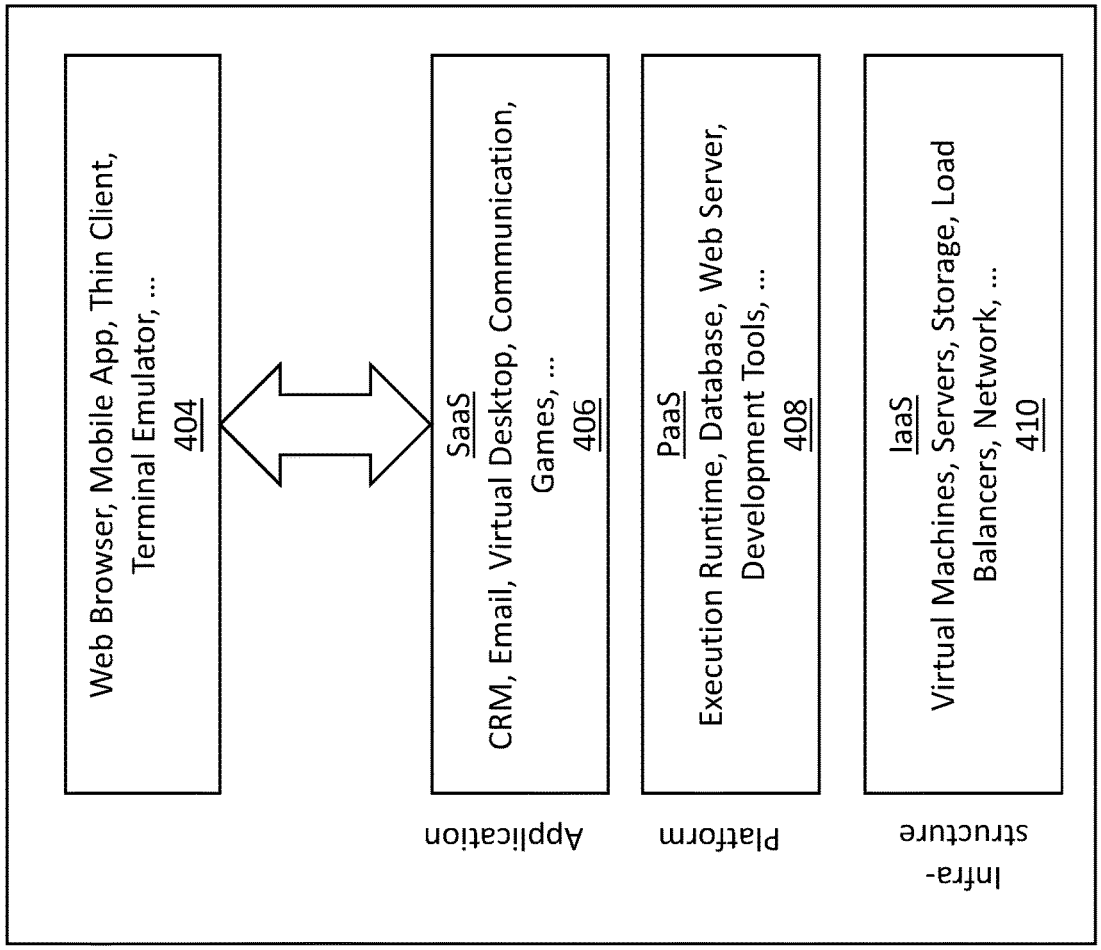
Figure 5B:
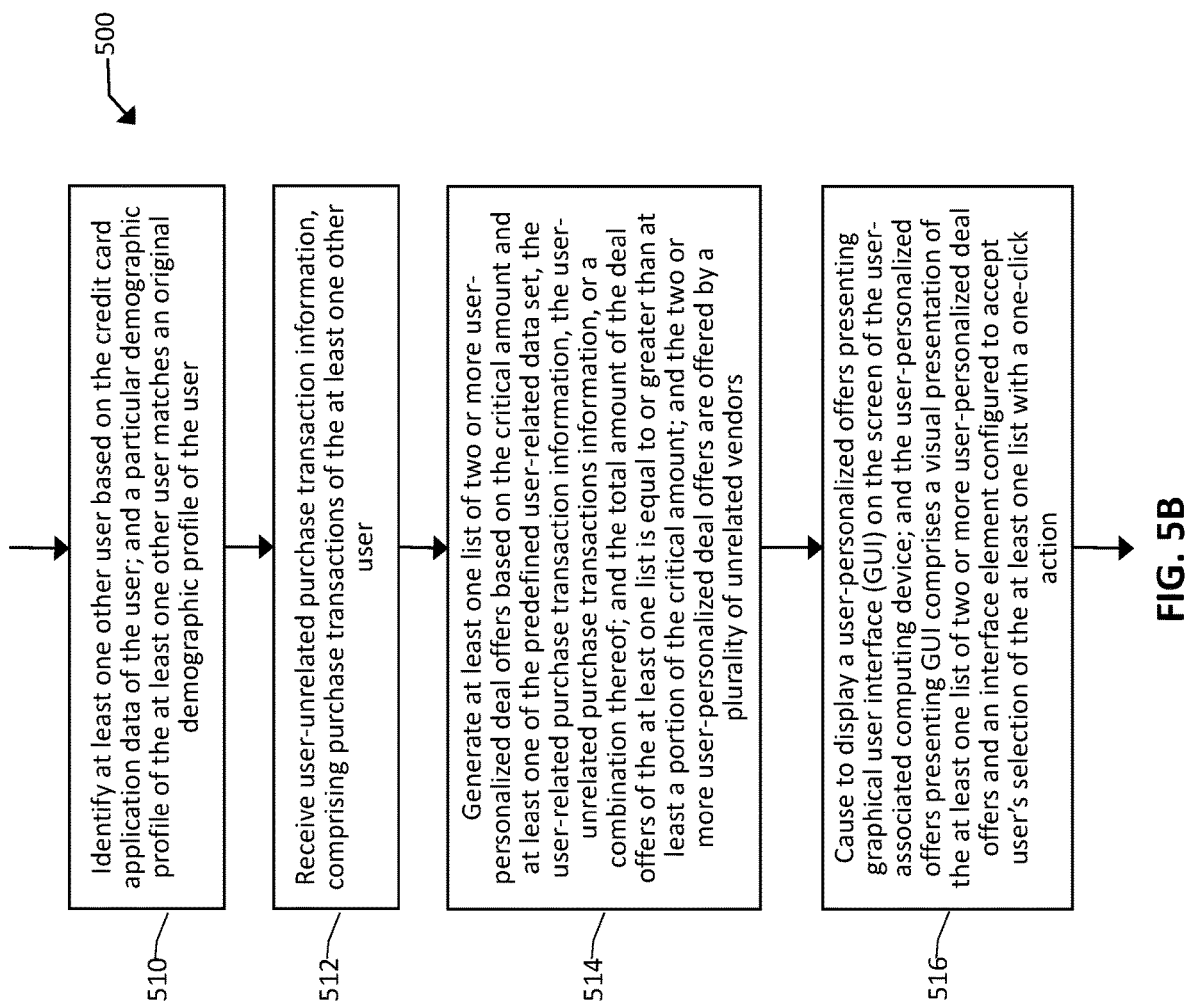
Figure 5D:
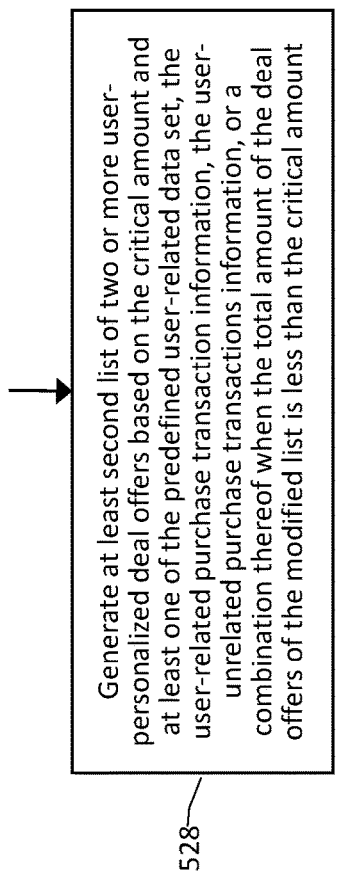

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 406, 408, 410 may be utilized in connection with the Web browser and browser extension aspects, shown at 404, to achieve the innovations herein.

Example Processes

FIGS. 5A-5D depict a flowchart illustrating one exemplary process 500 for helping customers/clients/users to meet their minimum spend requirement for their introductory credit card offer process in accordance with one or more embodiments of the present disclosure. For example, a user's device (202a-202n) may implement process 500 to allow customers to make one-click group purchase action to meet their minimum spend requirement for their introductory credit card offer.

At step 502, user devices (202a-202n) may receive a total spending amount of a promotional credit card associated with an introductory credit card offer. In some embodiments, the introductory credit card offer may include a minimum spending amount of the promotional credit card within a promotional time limit according to one or more embodiments.

At step 504, user devices (202a-202n) may determine a critical amount to satisfy the minimum spending amount of the promotional credit card. In some implementations, the critical amount can be calculated based on at least in part of the total spending amount of the promotional credit card and the minimum spending amount of the promotional credit card.

At step 506, user devices (202a-202n) may cause to present a reminder on a screen of a user-associated computing device. In various embodiments, the reminder may include the total spending amount of the promotional credit card, a total available credit amount of the promotional credit card, the minimum spending amount of the promotional credit card, or a combination thereof.

At step 508, user devices (202a-202n) may receive a predefined user-related data set. For example, the predefined user-related data set may comprise credit card application data of a user and user-related purchase transaction information. In certain implementations, the user-related purchase transaction information may comprise historical purchase transactions of the user.

At step 510, user devices (202a-202n) may identify at least one other user based on the credit card application data of the user. In one or more further embodiments, a particular demographic profile of the at least one other user may match an original demographic profile of the user.

At step 512, user devices (202a-202n) may receive user-unrelated purchase transaction information. For example, the user-unrelated purchase transaction information may comprise purchase transactions of the at least one other user. It should be noted that the user-unrelated transaction information which is received by the user will not include any personally identifiable information related to other user. For example, all personally identifiable information about other users in the user-unrelated transaction information will be removed by the system in advance to make sure that the user device will not receive it in order to protect the privacy of other users.

At step 514, user devices (202a-202n) may generate at least one list of two or more user-personalized deal offers based on the critical amount and at least one of the predefined user-related data set, the user-related purchase transaction information, the user-unrelated purchase transaction information, or a combination thereof.

In certain implementations, the total amount of the deal offers of the at least one list is equal to or greater than at least a portion of the critical amount. In some embodiments, the two or more user-personalized deal offers are offered by a plurality of unrelated vendors.

At step 516, user devices (202a-202n) may cause to display a user-personalized offers presenting graphical user interface (GUI) on the screen of the user-associated computing device. In some implementations, the user-personalized offers presenting GUI may comprise a visual presentation of the at least one list of two or more user-personalized deal offers and an interface element configured to accept user's selection of the at least one list with a one-click action. For example, the deal offers may include a round trip airline ticket, a hotel room, a rental car, and a concert ticket.

At step 518, user devices (202a-202n) may receive the first user's input to modify the at least one list from the user-associated computing device. For example, if the deal offers include a round trip airline ticket, a hotel room, a rental car, and a concert ticket, the user may remove one or more deal offers from the list, such as the concert ticket deal offer.

At step 520, user devices (202a-202n) may cause to modify the at least one list based on the above first user's input at step 518. For example, the concert ticket may be removed from the list according to the above example.

At step 522, user devices (202a-202n) may receive the second user's input indicating that the user has selected the one-click acceptance of the modified at least one list from the user-associated computing device. For example, the user may select to purchase the round-trip airline ticket, the hotel room, and the rental car but not the concert ticket according to the example above.

At step 524 user devices (202a-202n) may communicate with electric fulfillment computing systems of each unrelated vendor of the plurality of unrelated vendors to instruct each respective electric fulfillment system to fulfill a respective deal offer of the modified at least one list. For example, the airline tickets may be from American Airlines, the hotel room may be from Grand Hyatt, and the rental car may be from Enterprise. Further, each unrelated vendor may proceed his respective purchase transaction with the user separately at the same time when the user accepts by the one-click action.

At step 526 user devices (202a-202n) may cause to present a confirmation from each respective electric fulfillment computing system of each respective unrelated vendor of the plurality of unrelated vendors of the modified at least one list on the screen of the user-associated computing device. Further, each unrelated vendor may proceed his respective purchase transaction and send the confirmation to the user separately at the same time when the user accepts by the one-click action.

At step 528 user devices (202a-202n) may generate at least second list of two or more user-personalized deal offers based on the critical amount and at least one of the predefined user-related data set, the user-related purchase transaction information, the user-unrelated purchase transactions information, or a combination thereof when the total amount of the deal offers of the modified list is less than the critical amount.

Figure 6A:
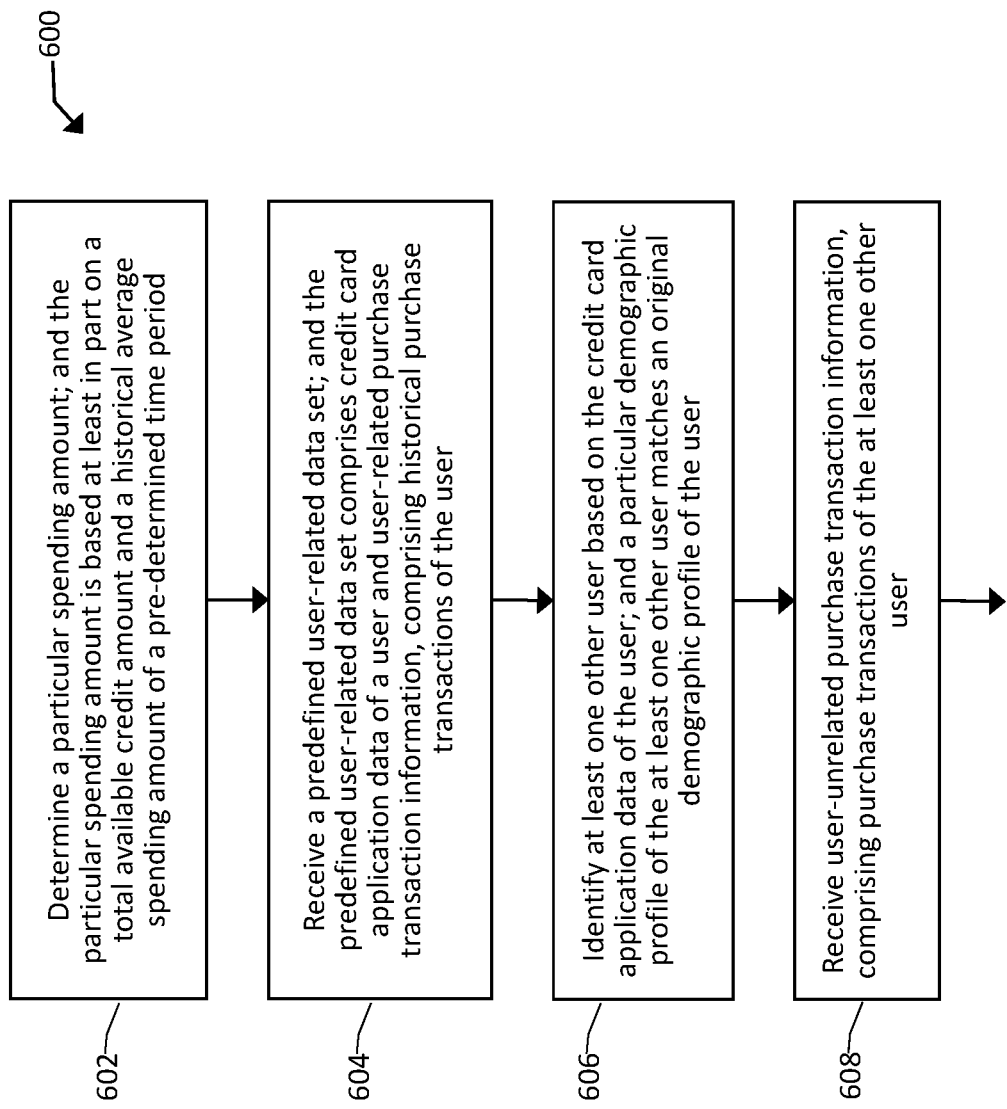
FIGS. 6A-6C are flowcharts illustrating one exemplary method for helping customers to meet their particular spending amount requirement process, consistent with exemplary aspects of at least some embodiments of the present disclosure.
Figure 6B:
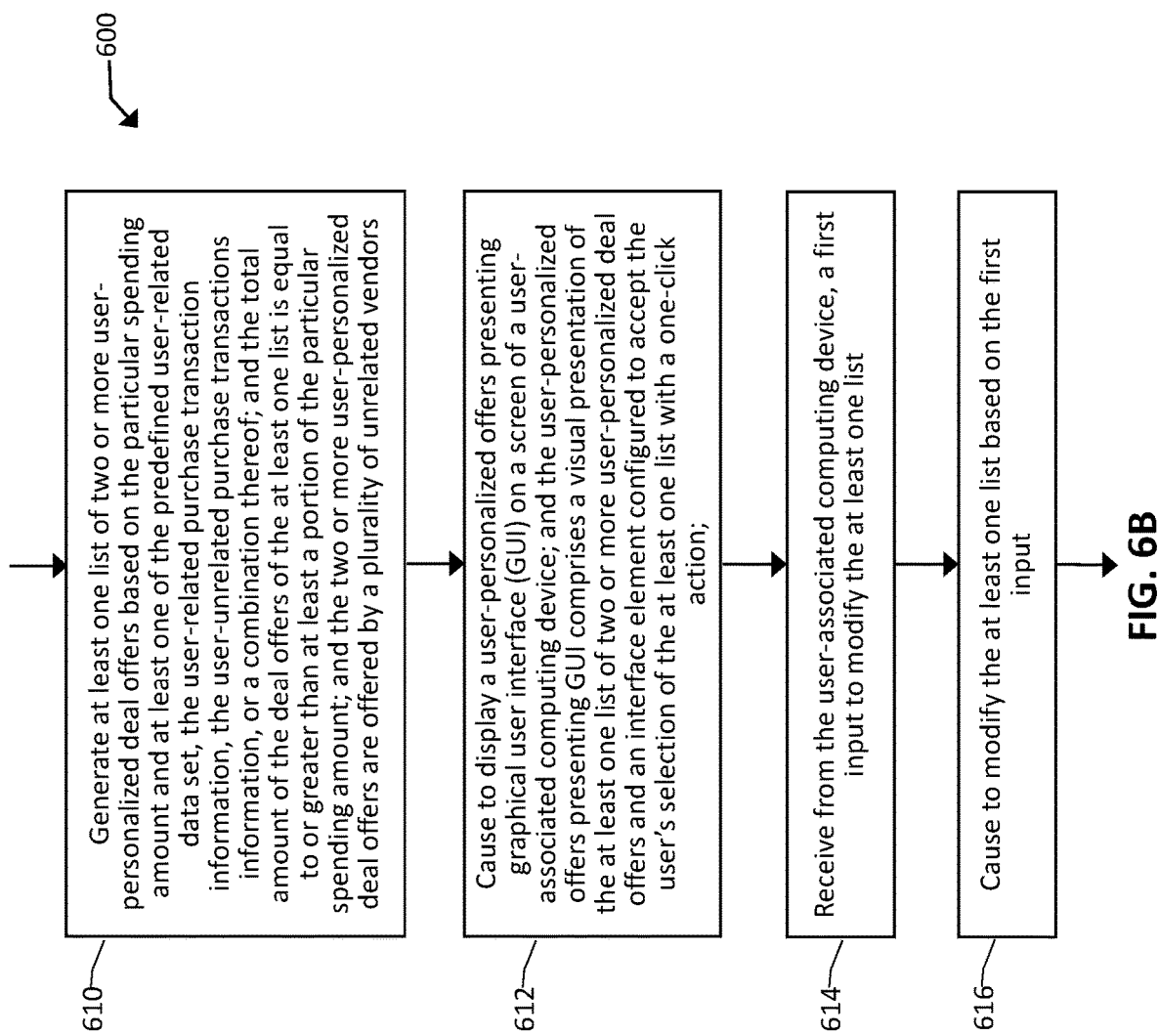
Figure 6C:
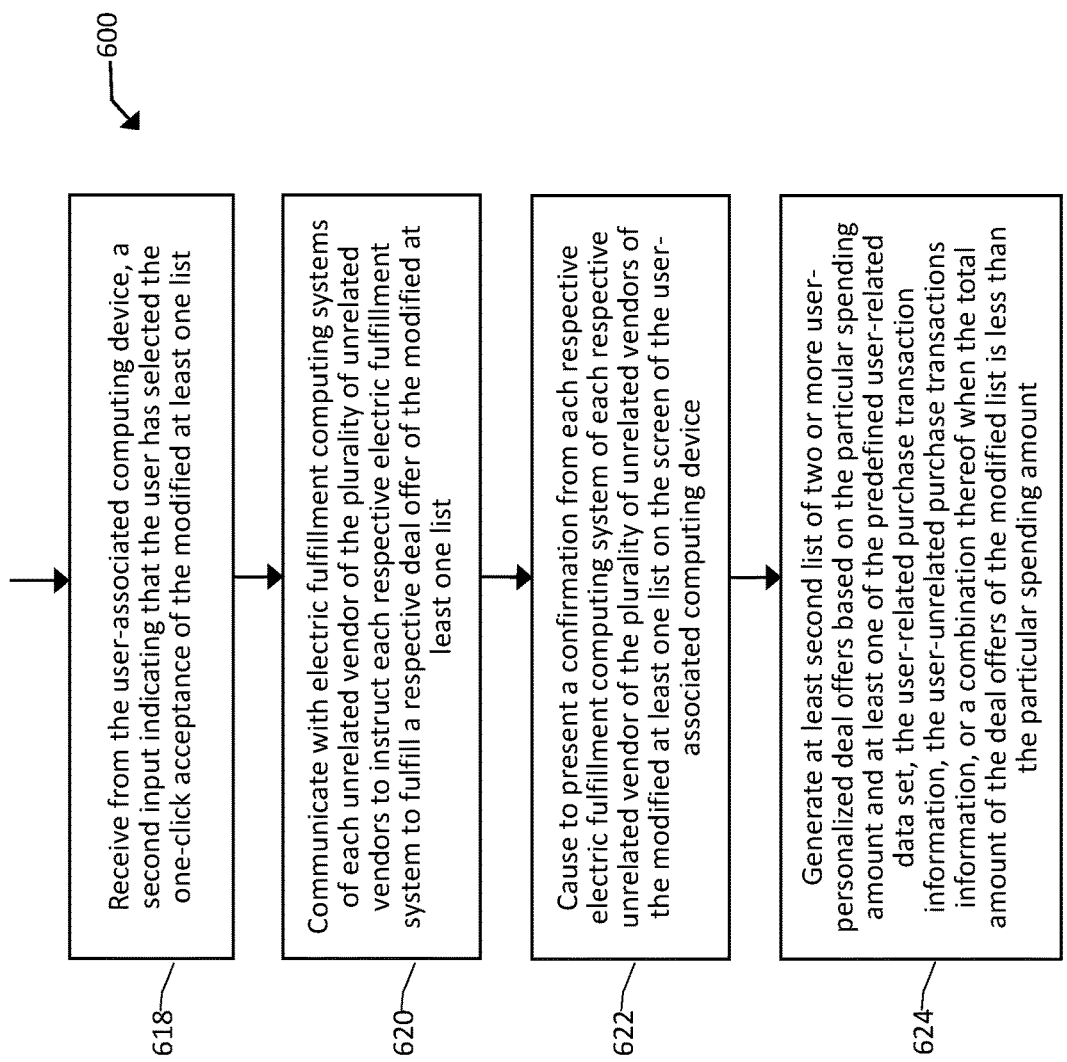

FIGS. 6A-6C depict a flowchart illustrating one exemplary process 600 for helping customers/clients/users to meet their particular spending amount requirement process in accordance with one or more embodiments of the present disclosure. For example, a user's device (202a-202n) can implement process 600 to allow customers to make one-click group purchase action to meet their particular spending amount requirement.

At step 602, user devices (202a-202n) may determine a particular spending amount. In some embodiments, the particular spending amount is based at least in part on a total available credit amount and a historical average spending amount of a pre-determined time period.

At step 604, user devices (202a-202n) may receive a predefined user-related data set. In some embodiments, the predefined user-related data set may comprise credit card application data of a user and user-related purchase transaction information. In one or more further embodiments, the user-related purchase transaction information may comprise historical purchase transactions of the user.

At step 606, user devices (202a-202n) may identify at least one other user based on the credit card application data of the user. In some implementations, the particular demographic profile of the at least one other user may match an original demographic profile of the user.

At step 608, user devices (202a-202n) may receive user-unrelated purchase transaction information. In various embodiments, the user-unrelated purchase transaction information may comprise purchase transactions of the at least one other user.

At step 610, user devices (202a-202n) may generate at least one list of two or more user-personalized deal offers based on the particular spending amount and at least one of the predefined user-related data set, the user-related purchase transaction information, the user-unrelated purchase transactions information, or a combination thereof. In certain implementations, the total amount of the deal offers of the at least one list is equal to or greater than at least a portion of the particular spending amount. In some embodiments, the two or more user-personalized deal offers are offered by a plurality of unrelated vendors.

At step 612, user devices (202a-202n) may cause to display a user-personalized offers presenting graphical user interface (GUI) on a screen of a user-associated computing device. For example, the user-personalized offers presenting GUI may comprise a visual presentation of the at least one list of two or more user-personalized deal offers and an interface element configured to accept the user's selection of the at least one list with a one-click action.

At step 614, user devices (202a-202n) may receive the first user's input to modify the at least one list from the user-associated computing device.

At step 616, user devices (202a-202n) may cause to modify the at least one list based on the first user's input.

At step 618, user devices (202a-202n) may receive the second user's input indicating that the user has selected the one-click acceptance of the modified at least one list from the user-associated computing device.

At step 620, user devices (202a-202n) may communicate with electric fulfillment computing systems of each unrelated vendor of the plurality of unrelated vendors to instruct each respective electric fulfillment system to fulfill a respective deal offer of the modified at least one list.

At step 622, user devices (202a-202n) may cause to present a confirmation from each respective electric fulfillment computing system of each respective unrelated vendor of the plurality of unrelated vendors of the modified at least one list on the screen of the user-associated computing device.

At step 624, user devices (202a-202n) may generate at least second list of two or more user-personalized deal offers based on the particular spending amount and at least one of the predefined user-related data set, the user-related purchase transaction information, the user-unrelated purchase transactions information, or a combination thereof when the total amount of the deal offers of the modified list is less than the particular spending amount.

Figure 7A:
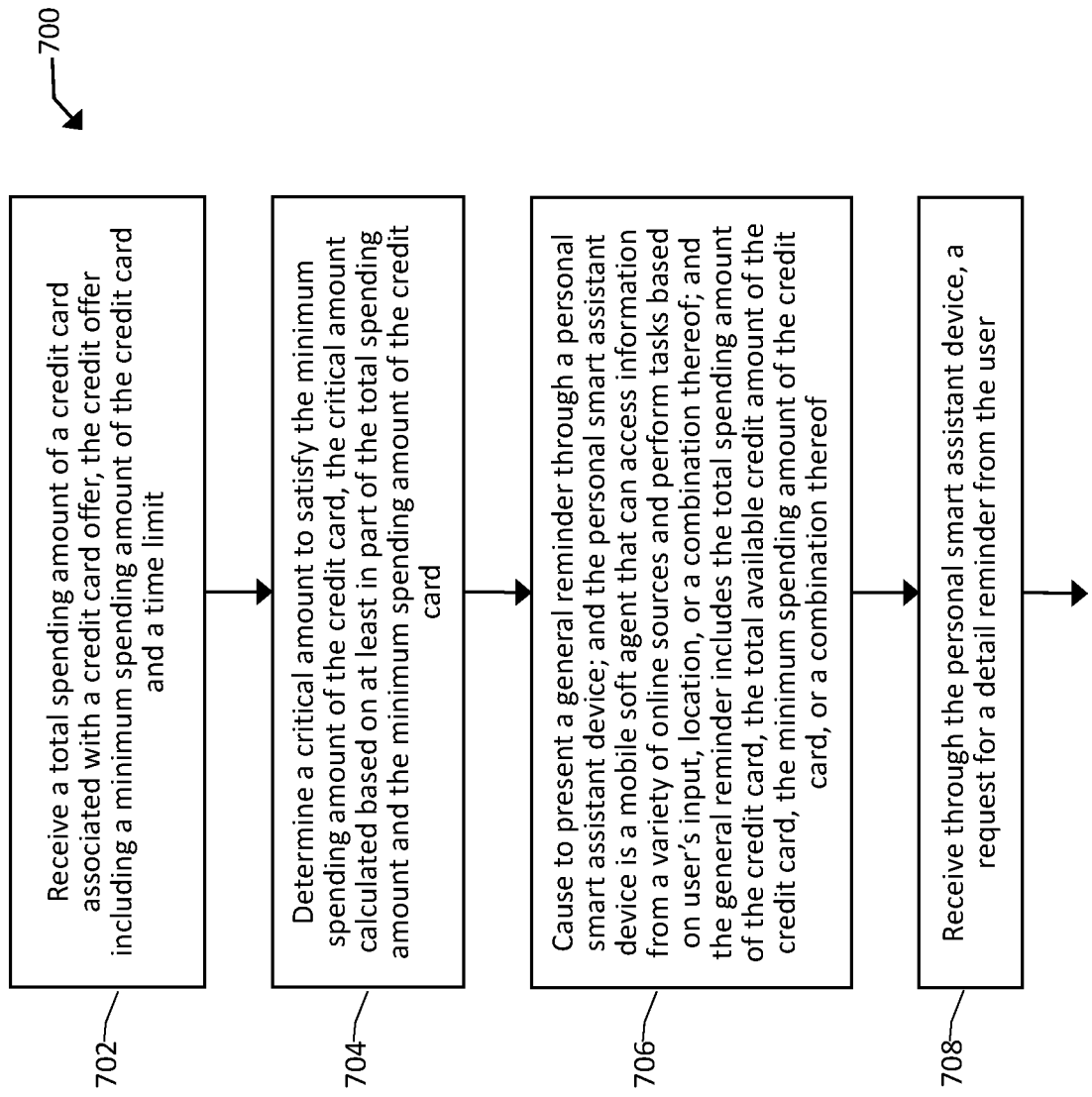
FIGS. 7A-7B are flowcharts illustrating one exemplary method for helping customers to meet their particular spending amount requirement by a personal smart assistant process, consistent with exemplary aspects of at least some embodiments of the present disclosure.
Figure 7B:
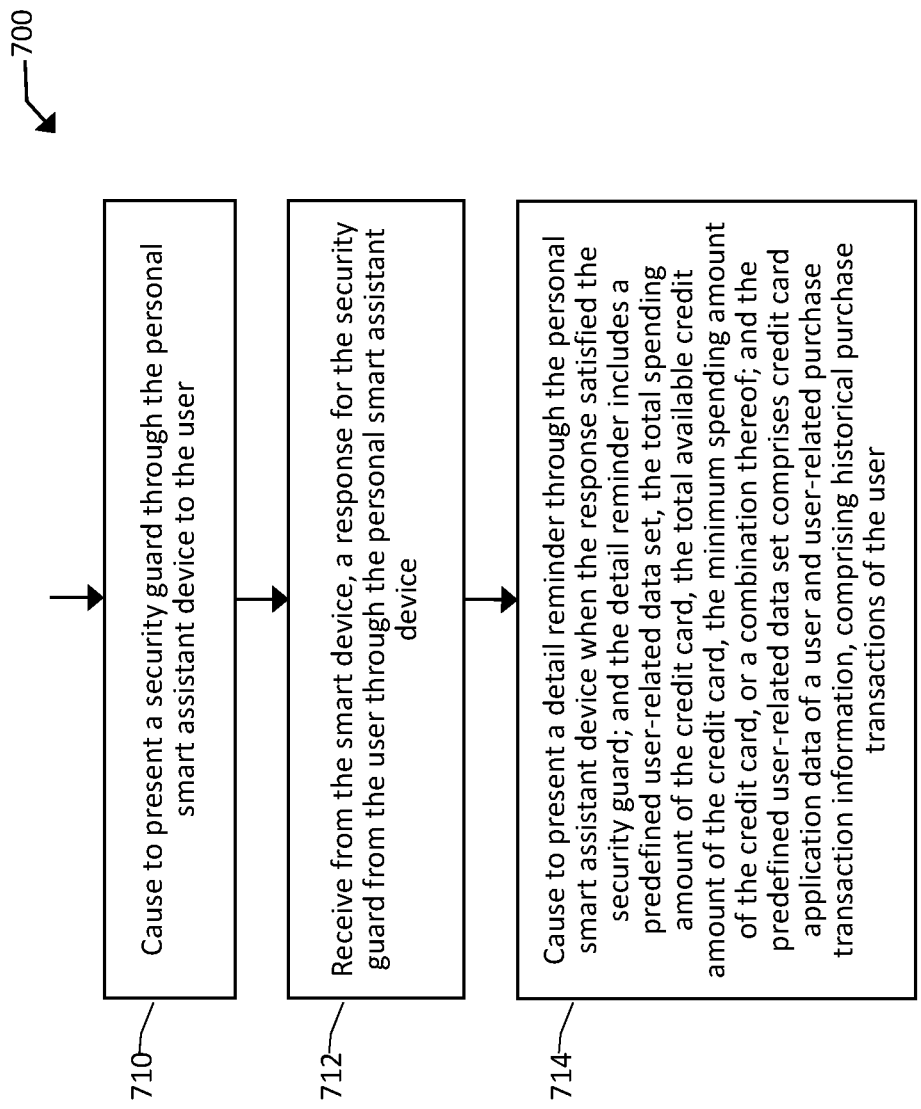

FIGS. 7A-7B depict a flowchart illustrating one exemplary process 700 for helping customers to meet their particular spending amount requirement by a personal smart assistant process in accordance with one or more embodiments of the present disclosure. For example, a user's device (101-104) can implement process 700 to allow customers to make one-click group purchase action to meet their particular spending amount requirement by a personal smart assistant.

At step 702, user devices (202a-202n) may receive a total spending amount of a credit card associated with a credit card offer. In some embodiments, the credit offer may include a minimum spending amount of the credit card and a time limit.

At step 704, user devices (202a-202n) may determine a critical amount to satisfy the minimum spending amount of the credit card. In some implementations, the critical amount may be calculated based on at least in part of the total spending amount and the minimum spending amount of the credit card.

At step 706, user devices (202a-202n) may cause to present a general reminder through a personal smart assistant device. For example, the personal smart assistant device may be a mobile soft agent that can access information from a variety of online sources and perform tasks based on user's input, location, or a combination thereof. In some embodiments, the general reminder may include the total spending amount of the credit card, the total available credit amount of the credit card, the minimum spending amount of the credit card, or a combination thereof.

At step 708, user devices (202a-202n) may receive a request for a detail reminder from the user through the personal smart assistant device.

At step 710, user devices (202a-202n) may cause to present a security guard through the personal smart assistant device to the user.

At step 712, user devices (202a-202n) may receive a response for the security guard from the user through the personal smart assistant device from the smart device.

At step 714, user devices (202a-202n) may cause to present a detail reminder through the personal smart assistant device when the response satisfied the security guard. In some embodiments, the detail reminder may include a predefined user-related data set, the total spending amount of the credit card, the total available credit amount of the credit card, the minimum spending amount of the credit card, or a combination thereof. In some implementations, the predefined user-related data set may comprise credit card application data of a user and user-related purchase transaction information. In some implementations, the user-related purchase transaction information may comprise historical purchase transactions of the user.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A computer-implemented method, the method comprising:
   receiving, by the computing device, a predefined user-related data set,
   wherein the predefined user-related data set comprises application data of a user and user-related transaction information, comprising historical transactions of the user;
   identifying, by the computing device, at least one other user based on the application data of the user,
   wherein a particular demographic profile of the at least one other user matches an original demographic profile of the user;
   receiving, by the computing device, user-unrelated transaction information and a pre-determined value corresponding to a number of electronic activities that the user is required to performed to meet a pre-determined performance target,
   wherein the user-unrelated transaction information comprises transactions of the at least one other user;
   generating, by the computing device, at least one list of two or more user-personalized electronic activities based on the number of electronic activities and at least one of the predefined user-related data set, the user-related transaction information, the user-unrelated transactions information, or a combination thereof,
   wherein the two or more user-personalized electronic activities are associated with distinct computing systems of two or more distinct entities; and
   causing, by the computing device, to display a user-personalized offers presenting graphical user interface (GUI) on the screen of the user-associated computing device, wherein the user-personalized offers presenting GUI comprises a visual presentation of the at least one list of two or more user-personalized electronic activities and an interface element configured to accept user's selection of the at least one list with a one-click action.

2. The method of clause 1, wherein the application data of the user includes credit card application data of the user, wherein the user-unrelated transaction information includes the user-unrelated purchase transaction information, wherein the electronic activities include deal offers, and wherein the two or more user-personalized deal offers are offered by a plurality of unrelated vendors.

3. The method of clause 2, further comprising:
receiving, by a computing device, a total spending amount of a promotional credit card associated with an introductory credit card offer, the introductory credit offer including the pre-determined performance target of the promotional credit card and a promotional time limit of the promotional credit card,
wherein the pre-determined value to meet the pre-determined performance target of the promotional credit card is calculated based on at least in part of the total spending amount of the promotional credit card and the pre-determined performance target of the promotional credit card;
causing, by the computing device, to present a reminder on a screen of a user-associated computing device, the reminder including the total spending amount of the promotional credit card, a total available credit amount of the promotional credit card, the pre-determined performance target of the promotional credit card, or a combination thereof;
receiving, by the computing device, from the user-associated computing device, a first input to modify the at least one list;
causing, by the computing device, to modify the at least one list based on the first input;
receiving, by the computing device, from the user-associated computing device, a second input indicating that the user has selected the one-click acceptance of the modified at least one list;
communicating, by the computing device, with electric fulfillment computing systems of each unrelated vendor of the plurality of unrelated vendors to instruct each respective electric fulfillment system to fulfill a respective deal offer of the modified at least one list;
causing, by the computer device, to present a confirmation from each respective electric fulfillment computing system of each respective unrelated vendor of the plurality of unrelated vendors of the modified at least one list on the screen of the user-associated computing device; and
generating, by the computing device, at least second list of an updated two or more user-personalized deal offers based on the pre-determined value and at least one of the predefined user-related data set, the user-related purchase transaction information, the user-unrelated purchase transactions information, or a combination thereof when the total amount of the deal offers of the modified list is less than the pre-determined value.

4. The method of clause 3, wherein the reminder further includes a refund amount of the promotional credit card, a billing cycle of the promotional credit card, the promotional time limit of the promotional credit card, or a combination thereof.

5. The method of clause 4, wherein the total spending amount of the promotional credit card equals to an amount that the promotional credit card being used minus the refund amount of the promotional credit card.

6. The method of clause 4, further comprising:
receiving, by the computing device, from the user-associated computing device, an instruction by the user.

7. The method of clause 6, further comprising:
causing, by the computing device, to adjust the billing cycle of the promotional credit card to match the time limit of the promotional credit card based on the instruction.

8. The method of clause 1, wherein the format of the reminder includes a textual representation, graphical formats, animations or a combination thereof.

9. The method of clause 1, wherein the format of the reminder is adjustable by the user.

10. The method of clause 1, wherein a frequency of the reminder is adjustable by the user.

11. A system, comprising:
one or more processors; and
a non-transitory computer-readable medium including one or more sequences of instructions that, when executed by the one or more processors, causes:
receiving, by a computing device, a total spending amount of a promotional credit card associated with an introductory credit card offer, the introductory credit offer including a minimum spending amount of the promotional credit card and a promotional time limit of the promotional credit card;
determining, by the computing device, a critical amount to satisfy the minimum spending amount of the promotional credit card, the critical amount calculated based on at least in part of the total spending amount of the promotional credit card and the minimum spending amount of the promotional credit card; and
causing, by the computing device, to present a reminder on a screen of a user-associated computing device, the reminder including the total spending amount of the promotional credit card, a total available credit amount of the promotional credit card, the minimum spending amount of the promotional credit card, or a combination thereof;
generating, by the computing device, at least one list of two or more user-personalized deal offers based on the critical amount and at least one of a predefined user-related data set, user-related purchase transaction information, user-unrelated purchase transactions information, or a combination thereof,
wherein the total amount of the deal offers of the at least one list is equal to or greater than at least a portion of the critical amount, and
wherein the two or more user-personalized deal offers are offered by a plurality of unrelated vendors; and
causing, by the computing device, to display a user-personalized offers presenting graphical user interface (GUI) on the screen of the user-associated computing device, wherein the user-personalized offers presenting GUI comprises a visual presentation of the at least one list of two or more user-personalized deal offers and an interface element configured to accept user's selection of the at least one list with a one-click action.

12. The system of clause 11, further comprising:
receiving, by the computing device, the predefined user-related data set,
wherein the predefined user-related data set comprises credit card application data of a user and the user-related purchase transaction information, comprising historical purchase transactions of the user;
identifying, by the computing device, at least one other user based on the credit card application data of the user, wherein a particular demographic profile of the at least one other user matches an original demographic profile of the user;

receiving, by the computing device, the user-unrelated purchase transaction information, comprising purchase transactions of the at least one other user;

receiving, by the computing device, from the user-associated computing device, an input indicating that the user has selected the one-click acceptance of the at least one list;

communicating, by the computing device, with electric fulfillment computing systems of each unrelated vendor of the plurality of unrelated vendors to instruct each respective electric fulfillment system to fulfill a respective deal offer of the at least one list; and causing, by the computer device, to present a confirmation from each respective electric fulfillment computing system of each respective unrelated vendor of the plurality of unrelated vendors of the at least one list on the screen of the user-associated computing device.

13. The system of clause 11, wherein the reminder further includes a refund amount of the promotional credit card, a billing cycle of the promotional credit card, the promotional time limit of the promotional credit card, or a combination thereof.

14. The system of clause 13, wherein the total spending amount of the promotional credit card equals to an amount that the promotional credit card being used minus the refund amount of the promotional credit card.

15. The system of clause 13, further comprising:
receiving, by the computing device, from the user-associated computing device, an instruction by the user.

16. The system of clause 15, further comprising:
causing, by the computing device, to adjust the billing cycle of the promotional credit card to match the time limit of the promotional credit card based on the instruction.

17. The system of clause 12, the two or more user-personalized deal offers include a gift card offer, a flight deal, a hotel deal, a local deal, a national deal or a combination thereof.

18. The system of clause 12, the two or more user-personalized deal offers include donation offers associated with a plurality of charities with a plurality of donation amount options.

19. The system of clause 11, wherein the format of the reminder includes a textual representation, graphical formats, animations or a combination thereof.

20. A computer-implemented method, the method comprising:

receiving, by a computing device, a total spending amount of a promotional credit card associated with an introductory credit card offer, the introductory credit offer including a minimum spending amount of the promotional credit card and a promotional time limit of the promotional credit card;

determining, by the computing device, a critical amount to satisfy the minimum spending amount of the promotional credit card, the critical amount calculated based on at least in part of the total spending amount of the promotional credit card and the minimum spending amount of the promotional credit card;

causing, by the computing device, to present a reminder on a screen of a user-associated computing device, the reminder including the total spending amount of the promotional credit card, a total available credit amount of the promotional credit card, the minimum spending amount of the promotional credit card, or a combination thereof;

receiving, by the computing device, a predefined user-related data set,
wherein the predefined user-related data set comprises credit card application data of a user and user-related purchase transaction information, comprising historical purchase transactions of the user;

identifying, by the computing device, at least one other user based on the credit card application data of the user,
wherein a particular demographic profile of the at least one other user matches an original demographic profile of the user;

receiving, by the computing device, user-unrelated purchase transaction information, comprising purchase transactions of the at least one other user;

generating, by the computing device, at least one list of two or more user-personalized deal offers based on the critical amount and at least one of the predefined user-related data set, the user-related purchase transaction information, the user-unrelated purchase transactions information, or a combination thereof, wherein the total amount of the deal offers of the at least one list is equal to or greater than at least a portion of the critical amount, and wherein the two or more user-personalized deal offers are offered by a plurality of unrelated vendors;

causing, by the computing device, to display a user-personalized offers presenting graphical user interface (GUI) on the screen of the user-associated computing device, wherein the user-personalized offers presenting GUI comprises a visual presentation of the at least one list of two or more user-personalized deal offers and an interface element configured to accept user's selection of the at least one list with a one-click action;

receiving, by the computing device, from the user-associated computing device, an input indicating that the user has selected the one-click acceptance of the at least one list;

communicating, by the computing device, with electric fulfillment computing systems of each unrelated vendor of the plurality of unrelated vendors to instruct each respective electric fulfillment system to fulfill a respective deal offer of the at least one list; and causing, by the computer device, to present a confirmation from each respective electric fulfillment computing system of each respective unrelated vendor of the plurality of unrelated vendors of the at least one list on the screen of the user-associated computing device.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method, the method comprising:
receiving, by the computing device, from a user-associated electronic computing device of a user, an electronic account request associated with a user;
wherein the electronic account request comprises a demographic profile of the user, application data of the user and a user-related transaction record for the user;

wherein the user-related transaction record represents historical purchase transactions of the user;

generating, by the computing device, an electronic account in response to the electronic account request, wherein the electronic account comprises a financial credit funding account associated with the user and further comprises a pre-determined transaction quantity target specifying a transaction activity requirement, wherein a transaction activity comprises an electronic purchase transaction and the transaction activity requirement comprises a minimum purchase requirement to be completed within a pre-determined time limit, wherein the transaction quantity target is associated with a promotional credit deal offered to the user in exchange for using the electronic account for transaction activities;

determining, by the computing device, a current transaction value aggregated from completed transaction activities of the user associated with the electronic account having the pre-determined transaction quantity target;

identifying, by the computing device, at least one similar user account of a plurality of other users accounts based on a matching of the user demographic profile of the user with at least one similar demographic profile associated with the at least one similar user account, wherein the similar user account comprises an electronic account for financial credit funding associated with purchase transactions of a similar user;

determining, by the computing device, a plurality of suggested user-personalized transactions associated with a plurality of distinct merchants, wherein the plurality of suggested user-personalized transactions are personalized for the user based on (i) the user-related transaction record of the user, (ii) purchase transactions of the similar user, or (iii) a combination of the two;

determining, by the computing device, at least one list of two or more suggested user-personalized transactions from the plurality of suggested user-personalized transactions associated with the plurality of distinct merchants based on a transaction value associated with each suggested user-personalized transaction of the plurality of suggested user-personalized transaction and the pre-determined transaction quantity target, wherein the list is configured to assist the user in meeting the pre-determined transaction quantity target;

causing, by the computing device, to display a reminder to the user generated on a pre-determined time frequency and prior to the pre-determined time limit, wherein the reminder comprises a transaction quantity target progress graphical user interface (GUI) displayed on the screen of the user-associated computing device to enable the user to engage in online purchase transaction activities to satisfy the predetermined transaction quantity target by the predetermined time limit, wherein the transaction quantity target progress GUI comprises:
  i) a progress indicator depicting the current transaction value of the electronic account of the user relative to the predetermined transaction quantity target to represent progress towards achieving the predetermined transaction quantity target;
  ii) a remaining spending indicator depicting a remaining transaction value comprising a difference between the predetermined transaction quantity target and the current transaction value;
  iii) a remaining time indicator depicting a time left from a current date to the predetermined time limit associated with the predetermined transaction quantity target;
  iv) at least one user-personalized list element depicting a visual presentation of the at least one list of the two or more suggested user-personalized transactions,
  wherein each user-personalized list element of the at least one user-personalized list element comprises a respective user-personalized transaction list, a respective user-personalized transaction list value and a one-click action;
  wherein the one-click action enables user-selection of a particular user-personalized transaction list of the at least one list to cause a respective transaction authorization for each respective user-personalized transaction of the two or more user-personalized transactions; and, executing, by the computing device, each of the two or more user-personalized transactions associated with the user's selection of the at least one list with the one-click action, wherein the executing comprises communicating with each of the plurality of distinct merchants associated with the selected user-personalized transactions, and wherein the executing causes the current transaction value of the electronic account of the user to be equal to or greater than the predetermined transaction quantity target.

2. The method of claim 1, wherein the application data of the user includes credit card application data of the user, wherein the similar user transaction information includes the purchase transactions of the similar user, wherein the transaction activities include deal offers, and wherein the two or more user-personalized deal offers are offered by a plurality of unrelated vendors.

3. The method of claim 2, further comprising:

receiving, by a computing device, a total spending amount of a promotional credit card associated with an introductory credit card offer, the introductory credit offer including the pre-determined transaction quantity target of the promotional credit card and a promotional time limit of the promotional credit card, wherein the pre-determined value to meet the pre-determined transaction quantity target of the promotional credit card is calculated based on at least in part of the total spending amount of the promotional credit card and the pre-determined performance target of the promotional credit card;

causing, by the computing device, to present a reminder on a screen of a user-associated computing device, the reminder including the total spending amount of the promotional credit card, a total available credit amount of the promotional credit card, the pre-determined performance target of the promotional credit card, or a combination thereof;

receiving, by the computing device, from the user-associated computing device, a first input to modify the at least one list;

causing, by the computing device, to modify the at least one list based on the first input;

receiving, by the computing device, from the user-associated computing device, a second input indicating that the user has selected the one-click action of the modified at least one list;

communicating, by the computing device, with electric fulfillment computing systems of each unrelated vendor of the plurality of unrelated vendors to instruct each respective electric fulfillment system to fulfill a respective deal offer of the modified at least one list;

causing, by the computer device, to present a confirmation from each respective electric fulfillment computing system of each respective unrelated vendor of the plurality of unrelated vendors of the modified at least one list on the screen of the user-associated computing device; and generating, by the computing device, at least one second list of an updated two or more user-personalized deal offers based on the pre-determined value and at least one of the predefined user-related data set, the user-related purchase transaction information, the user-unrelated purchase transactions information, or a combination thereof when the total amount of the deal offers of the modified list is less than the pre-determined value.

4. The method of claim 3, wherein the reminder further includes a refund amount of the promotional credit card, a billing cycle of the promotional credit card, the promotional time limit of the promotional credit card, or a combination thereof.

5. The method of claim 4, wherein the total spending amount of the promotional credit card equals to an amount that the promotional credit card being used minus the refund amount of the promotional credit card.

6. The method of claim 4, further comprising:
receiving, by the computing device, from the user-associated computing device, an instruction by the user.

7. The method of claim 6, further comprising:
causing, by the computing device, to adjust the billing cycle of the promotional credit card to match the time limit of the promotional credit card based on the instruction.

8. The method of claim 3, wherein the format of the reminder includes a textual representation, graphical formats, animations or a combination thereof.

9. The method of claim 3, wherein the format of the reminder is adjustable by the user.

10. The method of claim 3, wherein a frequency of the reminder is adjustable by the user.

11. A system, comprising:
one or more processors; and
a non-transitory computer-readable medium including one or more sequences of instructions that, when executed by the one or more processors, causes:
receiving, by the computing device, from a user-associated electronic computing device of a user, an electronic account request associated with a user;
wherein the electronic account request comprises a demographic profile of the user, application data of the user and a user-related transaction record for the user;
wherein the user-related transaction record represents historical purchase transactions of the user;
generating, by the computing device, an electronic account in response to the electronic account request, wherein the electronic account comprises a financial credit funding account associated with the user and further comprises a pre-determined transaction quantity target specifying a transaction activity requirement, wherein a transaction activity comprises an electronic purchase transaction and the transaction activity requirement comprises a minimum purchase requirement to be completed within a pre-determined time limit, wherein the transaction quantity target is associated with a promotional credit deal offered to the user in exchange for using the electronic account for transaction activities;

determining, by the computing device, a current transaction value aggregated from completed transaction activities of the user associated with the electronic account having the pre-determined transaction quantity target;

identifying, by the computing device, at least one similar user account of a plurality of other users accounts based on a matching of the user demographic profile of the user with at least one similar demographic profile associated with the at least one similar user account, wherein the similar user account comprises an electronic account for financial credit funding associated with purchase transactions of a similar user;

determining, by the computing device, a plurality of suggested user-personalized transactions associated with a plurality of distinct merchants, wherein the plurality of suggested user-personalized transactions are personalized for the user based on (i) the user-related transaction record of the user, (ii) purchase transactions of the similar user, or (iii) a combination of the two;

generating, by the computing device, at least one list of two or more suggested user-personalized transactions from the plurality of suggested user-personalized transactions associated with the plurality of distinct merchants based on a transaction value associated with each suggested user-personalized transaction of the plurality of suggested user-personalized transaction and the pre-determined transaction quantity target, wherein the list is configured to assist the user in meeting the pre-determined transaction quantity target;

wherein the total amount of the plurality of suggested user-personalized of the at least one list is equal to or greater than at least a portion of the pre-determined transaction quantity target, and wherein the plurality of distinct merchants comprise a plurality of unrelated vendors; and causing, by the computing device, to display a reminder to the user generated on a pre-determined time frequency and prior to the pre-determined time limit, wherein the reminder comprises a transaction quantity target progress graphical user interface (GUI) displayed on the screen of the user-associated computing device to enable the user to engage in online purchase transaction activities to satisfy the predetermined transaction quantity target by the predetermined time limit, wherein the transaction quantity target progress GUI comprises:

i) a progress indicator depicting the current transaction value of the electronic account of the user relative to the predetermined transaction quantity target to represent progress towards achieving the predetermined transaction quantity target;

ii) a remaining spending indicator depicting a remaining transaction value comprising a difference between the predetermined transaction quantity target and the current transaction value;

iii) a remaining time indicator depicting a time left from a current date to the predetermined time limit associated with the predetermined transaction quantity target;

iv) at least one user-personalized list element depicting a visual presentation of the at least one list of the two or more suggested user-personalized transactions, wherein each user-personalized list element of the at least one user-personalized list element comprises a respective user-personalized transaction list, a respective user-personalized transaction list value and a one-click action;

wherein the one-click action enables user-selection of a particular user-personalized transaction list of the at least one list to cause a respective transaction authorization for each respective user-personalized transaction of the two or more user-personalized transactions; and executing, by the computing device, each of the two or more user-personalized transactions associated with the user's selection of the list with the one-click action, wherein the executing comprises communicating with each of the plurality of distinct merchants associated with the selected user-personalized transactions, and wherein the executing causes the current transaction value of the electronic account of the user to be equal to or greater than the predetermined transaction quantity target.

12. The system of claim 11, wherein the reminder further includes a refund amount of the promotional credit card, a billing cycle of the promotional credit card, the promotional time limit of the promotional credit card, or a combination thereof.

13. The system of claim 12, wherein the total spending amount of the promotional credit card equals to an amount that the promotional credit card being used minus the refund amount of the promotional credit card.

14. The system of claim 12, further comprising:
receiving, by the computing device, from the user-associated computing device, an instruction by the user.

15. The system of claim 14, further comprising:
causing, by the computing device, to adjust the billing cycle of the promotional credit card to match the time limit of the promotional credit card based on the instruction.

16. The system of claim 11, the plurality of suggested user-personalized transactions include a gift card offer, a flight deal, a hotel deal, a local deal, a national deal or a combination thereof.

17. The system of claim 11, the plurality of suggested user-personalized transactions include donation offers associated with a plurality of charities with a plurality of donation amount options.

18. The system of claim 11, wherein the format of the reminder includes a textual representation, graphical formats, animations or a combination thereof.

19. A computer-implemented method, the method comprising:
receiving, by a computing device, a total spending amount of a promotional credit card associated with an introductory credit card offer, the introductory credit offer including a minimum spending amount of the promotional credit card and a promotional time limit of the promotional credit card;

determining, by the computing device, a transaction quantity target to satisfy the minimum spending amount of the promotional credit card, the transaction quantity target calculated based on at least in part of the total spending amount of the promotional credit card and the minimum spending amount of the promotional credit card;

causing, by the computing device, to present a reminder on a screen of a user-associated computing device, the reminder including the total spending amount of the promotional credit card, a total available credit amount of the promotional credit card, the minimum spending amount of the promotional credit card, or a combination thereof;

receiving, by the computing device, application data associated with the user,
   wherein the application data associated with the user comprises credit card application data of a user and user-related purchase transaction information, comprising historical purchase transactions of the user;

identifying, by the computing device, at least one similar user based on the credit card application data of the user,
   wherein a particular demographic profile of the at least one similar user matches an original demographic profile of the user;

receiving, by the computing device, user-unrelated purchase transaction information, comprising purchase transactions of the at least one similar user, generating, by the computing device, at least one list of a plurality of user-personalized transaction offers based on the transaction quantity target and at least one of the application data associated with the user, the user-related purchase transaction information, the user-unrelated purchase transactions information, or a combination thereof,
   wherein the total amount of the plurality of user-personalized transaction offers of the at least one list is equal to or greater than at least a portion of the transaction quantity target, and
   wherein the plurality of user-personalized transaction offers are offered by a plurality of unrelated vendors;

causing, by the computing device, to display a reminder to the user generated on a pre-determined time frequency and prior to the pre-determined time limit, wherein the reminder comprises a transaction quantity target progress graphical user interface (GUI) on the screen of the user-associated computing device to enable the user to engage in online activities associated with the plurality of user-personalized transaction offers to satisfy the transaction quantity target,
   wherein the transaction quantity target progress GUI comprises:
   i) a progress indicator depicting the current transaction value of the electronic account of the user relative to the predetermined transaction quantity target to represent progress towards achieving the predetermined transaction quantity target;
   ii) a remaining spending indicator depicting a remaining transaction value comprising a difference between the predetermined transaction quantity target and the current transaction value;
   iii) a remaining time indicator depicting a time left from a current date to the predetermined time limit associated with the predetermined transaction quantity target;
   iv) at least one user-personalized list element depicting a visual presentation of the at least one list of the plurality of user-personalized transaction offers, wherein each user-personalized list element of the at least one user-personalized list element comprises a respective user-personalized transaction list, a respective user-personalized transaction list value and a one-click action;

wherein the one-click action enables user-selection of a particular user-personalized transaction list of the at least one list to cause a respective transaction authorization for each respective user-personalized transaction offer of the plurality of user-personalized transaction offers; and receiving, by the computing device, from the user-associated computing device, an input indicating that the user has selected the one-click action of the at least one list;

communicating, by the computing device, with electric fulfillment computing systems of each unrelated vendor of the plurality of unrelated vendors to instruct each respective electric fulfillment system to fulfill a respective transaction offer of the at least one list;

wherein the communicating causes the current transaction value of the electronic account of the user to be equal to or greater than the predetermined transaction quantity target; and causing, by the computer device, to present a confirmation from each respective electric fulfillment computing system of each respective unrelated vendor of the plurality of unrelated vendors of the at least one list on the screen of the user-associated computing device;

wherein the confirmation comprises an update to the progress indicator of the transaction quantity target progress GUI to depict the current transaction value of the electronic account of the user to be equal to or greater than the predetermined transaction quantity target.

* * * * *